United States Patent
Christiansen et al.

(10) Patent No.: US 7,449,214 B2
(45) Date of Patent: Nov. 11, 2008

(54) PROCESS FOR THE PREPARATION OF SOLID OXIDE FUEL CELL

(75) Inventors: Niels Christiansen, Gentofte (DK); Jesper Norsk, Humlebæk (DK)

(73) Assignee: Haldor Topsoe A/S, Lyngby (DK)

(*) Notice: Subject to any disclaimer, the term of this patent is extended or adjusted under 35 U.S.C. 154(b) by 447 days.

(21) Appl. No.: 10/386,440

(22) Filed: Mar. 13, 2003

(65) Prior Publication Data
US 2003/0186101 A1  Oct. 2, 2003

(30) Foreign Application Priority Data
Mar. 27, 2002 (DK) ............................. 2002 00472

(51) Int. Cl.
  B05D 5/12 (2006.01)
  B05D 1/32 (2006.01)
  B05D 7/00 (2006.01)
(52) U.S. Cl. ............ 427/115; 427/258; 427/282; 427/421.1
(58) Field of Classification Search ......... 427/115, 427/282, 421.1, 258; 429/30, 38, 39
See application file for complete search history.

(56) References Cited

U.S. PATENT DOCUMENTS

| | | | |
|---|---|---|---|
| 5,998,054 A * | 12/1999 | Jones et al. ............ | 429/34 |
| 6,048,636 A | 4/2000 | Naoumidis et al. | |
| 6,099,984 A * | 8/2000 | Rock ............ | 429/39 |
| 6,376,118 B1 * | 4/2002 | Bruck et al. ............ | 429/41 |
| 6,602,630 B1 * | 8/2003 | Gopal ............ | 429/30 |
| 6,924,058 B2 * | 8/2005 | Ohlsen et al. ............ | 429/40 |
| 2002/0004155 A1 * | 1/2002 | Haltiner et al. ............ | 429/30 |
| 2002/0071983 A1 * | 6/2002 | Rowen et al. ............ | 429/34 |
| 2002/0192530 A1 * | 12/2002 | Kabumoto et al. ............ | 429/38 |
| 2003/0022052 A1 * | 1/2003 | Kearl ............ | 429/34 |
| 2003/0039875 A1 * | 2/2003 | Horiguchi et al. ............ | 429/26 |
| 2003/0059660 A1 * | 3/2003 | Kamo et al. ............ | 429/32 |
| 2003/0134170 A1 * | 7/2003 | Sarkar et al. ............ | 429/31 |
| 2003/0198860 A1 * | 10/2003 | Yasumoto et al. ............ | 429/43 |
| 2004/0048139 A1 * | 3/2004 | King ............ | 429/38 |
| 2004/0091758 A1 * | 5/2004 | Kuriyama et al. ............ | 429/22 |

FOREIGN PATENT DOCUMENTS

| | | | |
|---|---|---|---|
| CH | 515 622 A | | 11/1971 |
| DE | 3922673 | * | 1/1991 |
| EP | 0 414 270 A | | 2/1991 |
| JP | 03 055764 A | | 5/1991 |
| JP | 03 283266 A | | 3/1992 |
| JP | 08 037011 A | | 6/1996 |
| WO | WO 97/23007 A | | 6/1997 |

* cited by examiner

*Primary Examiner*—Brian K Talbot
(74) *Attorney, Agent, or Firm*—Dickstein Shapiro LLP

(57) ABSTRACT

Process for the preparation of a solid oxide fuel cell comprising chemically etching a metallic sheet covered with a photoresist and obtaining controlled patterns of cavities on one side of the metallic sheet and perforations on the other side of the metallic sheet and depositing electrochemically active segments on the perforated side of the metallic sheet. The invention includes also a solid oxide fuel cell prepared by the above process.

3 Claims, 1 Drawing Sheet

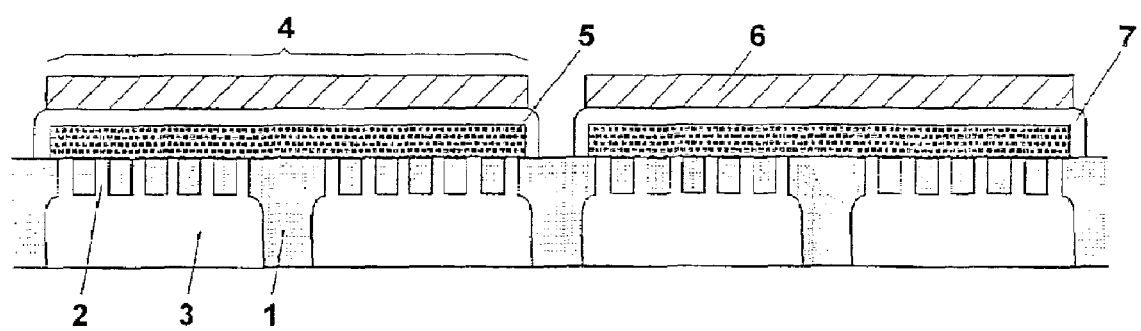
Figure

PROCESS FOR THE PREPARATION OF SOLID OXIDE FUEL CELL

BACKGROUND OF THE INVENTION

1. Field of the Invention

The invention relates to solid oxide fuel cells and in particular to the type of cells with the electrode material supported on a metallic support material.

2. Description of the Related Art

Recent development of thin supported electrolytes in connection with improved electrode performance allows lowering the operation temperature to temperatures where strong, cheap and ductile metallic materials may be used for bipolar separation plates between the cells. Current intermediate temperature solid oxide fuel cells operate at temperature from about 500° C. to 850° C., whereas older types of fuel cells operate at 900° C. to 1000° C. The lower operation temperature makes it possible to use metallic materials for the cell component supporting the electrode layers as well as the thin electrolyte layer.

In the known solid oxide fuel cells the layer supporting the electrochemical active element is a porous structure made of metallic or ceramic materials or mixtures of metallic and ceramic materials. Metallic felt or plasma sprayed porous layers have been proposed as the supporting structure, in which the pores in the support layer distribute the cell reactant gases.

U.S. Pat. No. 6,048,636 discloses an electrode for a fuel cell with a porous, mechanically strong, self-supporting layer consisting of a cermet comprising $Al_2O_3$ or $TiO_2$ to which nickel is admixed. By locating gas channels within the mechanically stabilising electrode layer, the gas can be supplied to a catalytically active layer by a shorter path as compared to prior art.

U.S. Patent Application Publ. No. 2002/0004155 discloses an etched interconnect for fuel cell elements comprising solid oxide electrolyte, an anode, and a cathode and includes a conductive base sheet having first and second faces having anode and cathode gas flow passages, respectively. These gas flow passages can have various geometries selected to optimise fuel and oxidant gas flow and they can be prepared using a photochemical etching process. When in use, the interconnect is placed between two fuel cells. The interconnect surface corresponds to the surface occupied by a single fuel cell.

The proposed porous cell support materials are, however, problematic with respect to manufacturing methods, and porous materials posses poor mechanical properties. Furthermore, a porous gas distribution body does not permit the flow pattern of the cell reactant gasses to be controlled.

It is the objective of this invention to provide a fuel cell whose supporting structure for the electrochemically active element is made of a metallic body perforated with fine holes or channels in a controlled pattern to enable a controlled distribution of the reaction gasses directly to the electrochemically active element.

SUMMARY OF THE INVENTION

The invention therefore concerns a process for the preparation of a solid oxide fuel cell comprising chemically etching a metallic sheet covered with a photoresist and obtaining controlled patterns of cavities on one side of the metallic sheet and perforations on the other side of the metallic sheet and depositing electrochemically active segments on the perforated side of the metallic sheet.

The invention also concerns a solid oxide fuel cell prepared by the above-mentioned process.

BRIEF DESCRIPTION OF THE DRAWING

The sole drawing shows a section of the preferred embodiment of the solid oxide fuel cell of the present invention.

DETAILED DESCRIPTION OF THE INVENTION

Using a chemical etching method, a metallic sheet covered with a photoresist is perforated with fine channels in a controlled pattern. When using a photoresist on both sides of the metallic sheet, the perforations can have an asymmetric structure. The metallic sheet with its controlled pattern of fine through perforations forms a strong ductile and easy to manufacture support for the electrochemically active element.

The metallic sheet has a smooth, homogeneous surface free of defects contrary to a porous support. The asymmetric geometry of the through perforations permits a very fine diameter of the perforations on the one side of the sheet and a larger diameter of cavities on the other side of the etched sheet.

The etching method also allows the manufacturing of cavities from one side of the sheet only going partly through the material continuing with a larger number of smaller perforations going through the remaining part of the material. In this way a perforated fine structure is obtained on the one side of the sheet ideal for deposition of the electrochemically active layer. The opposite side of the sheet with the larger cavities ensures unrestricted gas supply and low gas flow resistance.

The through perforations are arranged in segments such that all the perforations in one segment are covered by a segment of the electrochemically active layer. This means that all the perforations in one segment are supplying gas to the electrochemically active segment covering these perforations and only to this segment. According to the invention, subdividing the whole cell area in smaller cell segments makes it possible to ensure that each cell segment operates under optimal gas supply conditions irrespective of the position in the cell.

Another advantage of such a segmentation of the cell area into a larger number of smaller individual electrochemically active segments is that the area of the brittle ceramic electrolyte layer which belongs to the individually electrochemically active segments is reduced. By reduction of the electrolyte area the probability of electrolyte fracture occurring is minimized. However, the overall cell area is still determined by the size of the metallic support sheet and is the sum of the area of each individual electrochemically active segment.

The FIGURE shows a section of the solid oxide fuel cell of the invention depicting an embodiment of the invention. From the FIGURE, it can be seen that the metallic sheet 1 has perforations 2 on one side, each perforation having a diameter smaller than the cavity 3 on the other side of the sheet. The FIGURE also illustrates the placement of the electrochemically active segments 4 deposited on the metallic sheet 1.

The electrochemically active segment pattern may be deposited on the metallic support sheet by known depositing processes such as: screen printing, pattern spray painting, ink jet printing or photo resist spraying. The electrode layers 5 and 6 deposited on the metallic sheet consist of an anode layer, an electrolyte layer 7 and a cathode layer. In total these layers including the perforated metallic sheet constitute a cell.

The invention claimed is:

1. A process for the preparation of a solid oxide fuel cell comprising:

providing a metallic sheet and chemically etching the metallic sheet to divide a surface area of the metallic sheet and to obtain a plurality of individual cell segments laterally displaced relative to each other on the surface area of the metallic sheet, each of the plurality of cell segments comprising controlled patterns of cavities on the surface of the metallic sheet and a controlled pattern of through perforations on opposite surface of the metallic sheet, the cavities extending partially through the metallic sheet and being continuous with and in communication with more than one of the perforations on the opposite surface of the metallic sheet, wherein the perforations on the surface are etched with a width smaller than the width of the cavities on the opposite surface; and providing a plurality of electrochemically active segments on the perforated surface of the metallic sheet, each of the plurality of electrochemically active segments consisting of an anode layer, an electrolyte layer and a cathode layer, each of the plurality of electrochemically active segments corresponding to each of the plurality of cell segments.

2. The process of claim 1, wherein the step of providing the electrochemically active segments further comprises depositing the anode layer, the electrolyte layer and the cathode layer on the metallic sheet.

3. The process of claim 2, wherein the step of depositing the anode layer, the electrolyte layer and the cathode layer is conducted by a process selected from the group consisting of screen printing, pattern spray painting, ink jet printing and photoresist spraying.

* * * * *